United States Patent
Chung et al.

(10) Patent No.: US 10,976,944 B2
(45) Date of Patent: Apr. 13, 2021

(54) DATA STORAGE DEVICE USING GENERAL PURPOSE INPUT/OUTPUT (GPIO) AND ELECTRONIC FUSE (EFUSE) CIRCUIT FOR CONFIGURATION OF READ ONLY MEMORY (ROM) CODE

(71) Applicant: Silicon Motion, Inc., Hsinchu County (TW)

(72) Inventors: Chien-Chung Chung, Taipei (TW); Da-Ru Yu, Taipei (TW); Wei-Chia Su, Tainan (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/690,057

(22) Filed: Nov. 20, 2019

(65) Prior Publication Data
US 2020/0210085 A1    Jul. 2, 2020

(30) Foreign Application Priority Data

Jan. 2, 2019 (TW) ................................. 108100003

(51) Int. Cl.
| G06F 3/00 | (2006.01) |
| G06F 3/06 | (2006.01) |
| G06F 13/16 | (2006.01) |

(52) U.S. Cl.
CPC .......... *G06F 3/0632* (2013.01); *G06F 3/0656* (2013.01); *G06F 3/0659* (2013.01); *G06F 3/0679* (2013.01); *G06F 13/1668* (2013.01)

(58) Field of Classification Search
CPC .... G06F 3/0632; G06F 3/0656; G06F 3/0659; G06F 3/0679; G06F 13/1668
See application file for complete search history.

(56) References Cited

U.S. PATENT DOCUMENTS

| 7,586,795 | B2 | 9/2009 | Kutz |
| 8,873,320 | B2* | 10/2014 | Goel ...................... G11C 29/76 |
| | | | 365/200 |
| 9,165,143 | B1 | 10/2015 | Sanders |
| 9,230,112 | B1 | 1/2016 | Peterson |
| 9,547,489 | B2* | 1/2017 | Pirvu ..................... G06F 21/575 |
| 10,184,983 | B2* | 1/2019 | Mistry ............ G01R 31/31908 |
| 10,685,120 | B2* | 6/2020 | Chen ...................... G06F 8/654 |
| 2005/0268092 | A1 | 12/2005 | Shankar |
| 2016/0013110 | A1 | 1/2016 | Brokish |

FOREIGN PATENT DOCUMENTS

| CN | 101916089 A | 12/2010 |
| CN | 102681868 A | 9/2012 |

* cited by examiner

*Primary Examiner* — Tammara R Peyton
(74) *Attorney, Agent, or Firm* — Winston Hsu

(57) ABSTRACT

A method for performing configuration management, an associated data storage device and the controller thereof are provided. The method may include: reading a read-only memory (ROM) code from a ROM to execute the ROM code; during executing the ROM code, detecting a first set of states of a general-purpose input/output (GPIO) circuit to perform a first portion of system configuration settings of the ROM code according to the first set of states; during executing the ROM code, detecting a second set of states of an electronic fuse (eFuse) circuit to perform a second portion of system configuration settings of the ROM code according to the second set of states; and executing at least one program code to make the data storage device be ready for being accessed by a host device.

20 Claims, 3 Drawing Sheets

DATA STORAGE DEVICE USING GENERAL PURPOSE INPUT/OUTPUT (GPIO) AND ELECTRONIC FUSE (EFUSE) CIRCUIT FOR CONFIGURATION OF READ ONLY MEMORY (ROM) CODE

BACKGROUND OF THE INVENTION

1. Field of the Invention

The present invention relates the access of a flash memory, and more particularly, to a method for performing configuration management, and an associated data storage device and the controller thereof.

2. Description of the Prior Art

Flash memories have been widely applied to various portable or non-portable data storage device, such as memory cards conforming to the SD/MMC, CF, MS, XD or UFS specification, solid state drives (SSDs), or embedded storage devices conforming to the UFS or EMMC specification. In an early stage of the development, NAND flash memories may comprise single level cell (SLC) and multiple level cell (MLC) flash memories. With the continuous progress of the memory techniques, more recent data storage device products may be manufactured by adopting triple level cell (TLC) flash memories, or even quadruple level cell (QLC) flash memories. To ensure that the access control of the flash memory in the data storage device conforms to associated specifications, the controller of the flash memory is usually equipped with some management mechanisms to properly manage the internal operations thereof.

Even memory devices with the above management mechanisms may have certain deficiencies, however. For example, when the types or models of flash memories are changed according to some demands (such as the demands from new clients or the demands regarding new products), the settings of the system configuration may need to be modified correspondingly, which may result in the change of the ROM code design. The conventional architecture commonly used in this field may adjust the settings of the system configuration via the General-Purpose Input/output (GPIO). For example, the settings of the system configuration may be adjusted by pulling high or pulling low the voltage levels of the GPIO pins, in order to set different voltage levels for the system configuration.

However, since the number of the pins of the GPIO is limited, the conventional architecture may only provide limited amount of system configuration settings, which fails to meet the actual requirements and also leaves the problem unsolved. Further, implementing the data storage device according to the conventional architecture will introduce additional problems such as some side effects. For example, the manufacturing costs may increase due to the need for setting up an additional resistor to pull high or pull low the voltage levels of the GPIO pins. Specifically, in order to place resistors, the area of the printed circuit board (PCB) and the complexity of the layout will inevitably increase. Therefore, there is a need for a novel method and associated architecture to achieve a data storage device with the flexibility of updating configurations without introducing a side effect or in a way less likely to introduce a side effect.

SUMMARY OF THE INVENTION

An objective of the present invention is to provide a method for performing configuration management, and an associated data storage device and a controller thereof, in order to solve the aforementioned problem.

An objective of the present invention is to provide a method for performing configuration management, and an associated data storage device and a controller thereof, in order to provide the data storage device with configuration updating flexibility without introducing a side effect or in a way less likely to introduce a side effect.

At least one embodiment of the present invention provides a method for performing configuration management, wherein the method is applicable to a data storage device. The data storage device comprising a non-volatile (NV) memory, and the NV memory comprises at least one NV memory element. The method comprises: reading a read-only memory (ROM) code from a ROM to execute the ROM code; during executing the ROM code, detecting a first set of states of a general-purpose input/output (GPIO) circuit to perform a first portion of system configuration settings of the ROM code according to the first set of states; during executing the ROM code, detecting a second set of states of an electronic fuse (eFuse) circuit to perform a second portion of system configuration settings of the ROM code according to the second set of states; and executing at least one program code to make the data storage device be ready for being accessed by a host device.

At least one embodiment of the present invention provides a data storage device that comprises an NV memory and controller. The NV memory is arranged to store information, wherein the NV memory comprises at least one NV memory element. The controller is coupled to the NV memory, the controller arranged to control operations of the data storage device, wherein the controller comprises a ROM, an electronic fuse (eFuse) circuit and a processing circuit. The ROM is arranged to store a ROM code. The eFuse circuit is arranged to store setting information. The processing circuit is arranged to control the controller according to a plurality of host device commands from a host device, to allow the host device to access the NV memory via the controller, wherein: the processing circuit reads the ROM code from the ROM, to execute the ROM code; during executing the ROM code, the processing circuit detects a first set of states of a General-Purpose Input/output (GPIO) circuit in the data storage device, to perform a first portion of system configuration settings of the ROM code according to the first set of states; during executing the ROM code, the processing circuit detects a second set of states of an electronic fuse (eFuse) circuit to perform a second portion of system configuration settings of the ROM code according to the second set of states; and the processing circuit executes at least one program code to make the data storage device be ready for being accessed by the host device.

At least one embodiment of the present invention provides a controller of a data storage device. The data storage device comprises the controller and an NV memory. The NV memory comprises at least one NV memory element, and the controller comprises: a ROM, an eFuse circuit and a processing circuit. The ROM is arranged to store a ROM code. The eFuse circuit is arranged to store setting information. The processing circuit is arranged to control the controller according to a plurality of host device commands from a host device, to allow the host device to access the NV memory via the controller, wherein: the processing circuit reads the ROM code from the ROM, to execute the ROM code; during executing the ROM code, the processing circuit detects a first set of states of a General-Purpose Input/output (GPIO) circuit in the data storage device, to perform a first portion of system configuration settings of the ROM code according to the first set of states; during executing the ROM code, the processing circuit detects a second set of states of the eFuse circuit, to perform a second portion of system configuration settings of the ROM code according to the second set of states; and the processing circuit executes at least one program code, to make the data storage device be ready for being accessed by the host device.

An advantage provided by the present invention is that, through the system configuration settings based on the eFuse circuit, the present invention can perform proper control for the operations of the controller, and more particularly, can control the system configuration settings flexibly in response to various requirements (e.g. the demands from new clients or the demands regarding new products) by using the same hardware architecture. Further, the implementation of the embodiments of the present invention will not significantly increase additional cost, and therefore the problems encountered in related arts can be solved without significantly increasing the overall cost. In comparison with the conventional architecture commonly used in this field, the present invention is capable of achieving the optimal efficiency of the data storage device without introducing a side effect or in a way less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
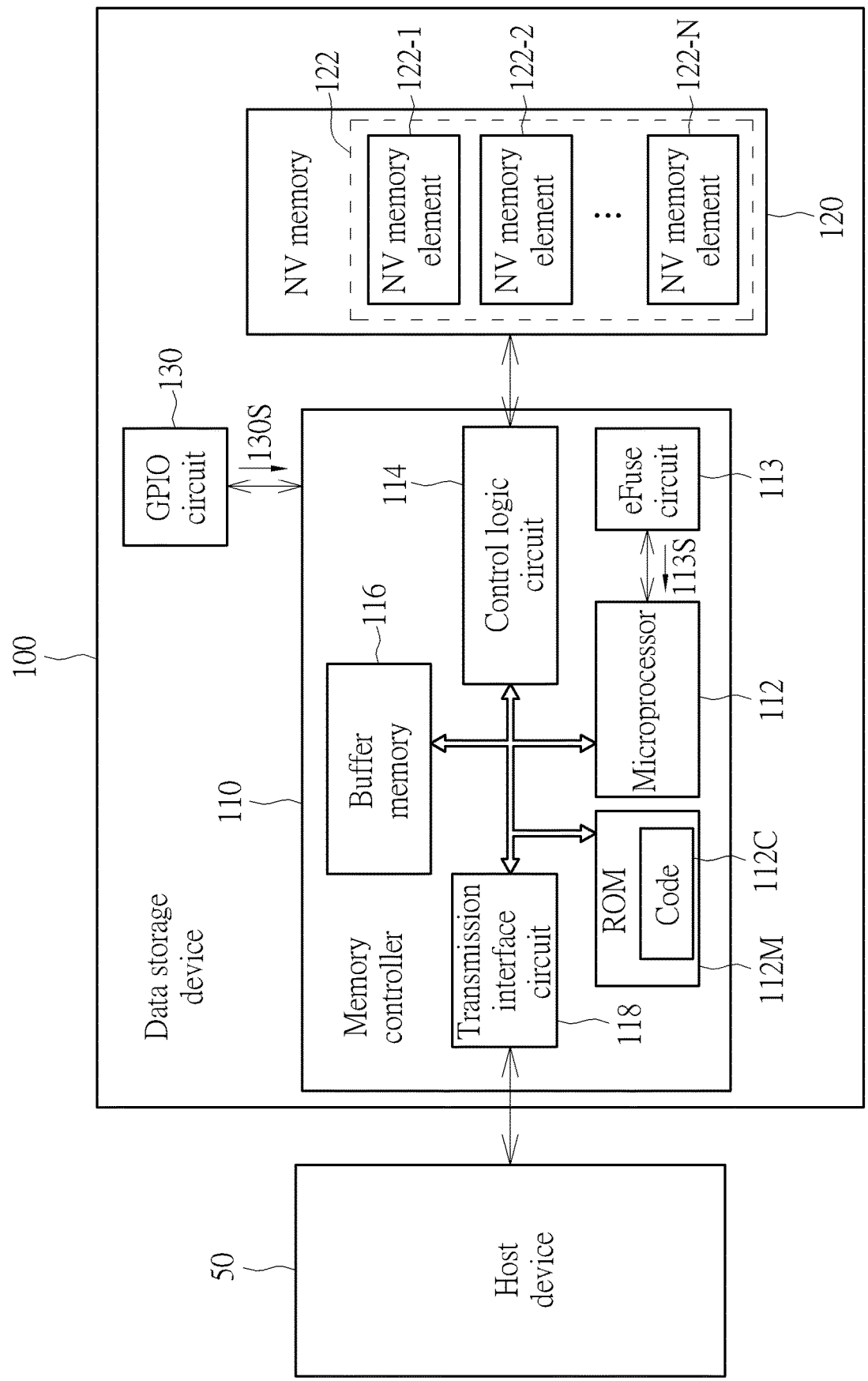
FIG. 1 is a diagram illustrating a data storage device and a host device according to an embodiment of the present invention.

FIG. 1 is a diagram illustrating a data storage device 100 and a host device 50 according to an embodiment of the present invention. For example, the data storage device 100 may be a solid state drive (SSD). Further, examples of the host device 50 may include, but are not limited to: multi-functional mobile phones, tablets, and personal computers (such as desktops and laptops). According to this embodiment, the data storage device 100 may comprise a controller such as the memory controller 110 and the NV memory 120. The data storage device 100 may further comprise a dynamic random access memory (DRAM). In addition, the memory controller 110 is arranged to access the NV memory 120, and the NV memory 120 is arranged to store information, for example, at least one in-system programming (ISP) code, user data, at least one logical-to-physical (L2P) mapping table, etc. If the data storage device 100 comprises a DRAM, the memory controller 110 may temporarily store the aforementioned information into the DRAM in order to accelerate the data access speed. The GPIO circuit 130 of the memory controller 110 may control the operations of the GPIO pins. With proper settings on the GPIO pins, the GPIO pins may provide secondary system configuration setting values. The NV memory 120 may comprise a plurality of NV memory elements 122-1, 122-2, ... and 122-N, wherein the symbol "N" may represent an integer greater than one. For example, the NV memory 120 may be a flash memory, and the NV memory elements 122-1, 122-2, ... and 122-N may respectively be a plurality of flash memory chips, a plurality of flash memory dies, or logical units named as logical unit numbers (LUNs), but the present invention is not limited thereto.

As shown in FIG. 1, the memory controller 110 may comprise a processing circuit such as a microprocessor 112, a storage such as a ROM 112M, an electronic fuse (eFuse) circuit 113, a control logic circuit 114, a buffer memory 116 and a transmission interface circuit 118, wherein these elements may be coupled to one another via a common bus. The buffer memory 116 may be implemented with a random access memory (RAM), and more preferentially a Static RAM (SRAM).

The ROM 112M in this embodiment is arranged to store a code 112C which may be taken as an example of the ROM code mentioned above, and the processor 112 is arranged to execute the code 112C to enter the ROM code mode in order to complete the initialization of the elements in the processor 112 and control the operations of the NV memory 120. Please note that the code 112C may also be stored in the buffer memory 116 or any types of memories. Further, the eFuse circuit 113 may be arranged to store confidential information, for example, store the main portion of all of the system configuration setting values, user keys, manufacturer identifications (IDs), etc. that are needed during executing the ROM code.

The control logic circuit 114 may comprise an error correction code circuit (not shown) to protect data and/or perform error correction. The transmission interface circuit 118 may conform to a specific communications specification, such as the Serial Advanced Technology Attachment (SATA) specification, the Peripheral Component Interconnect Express (PCIE) specification, the Advanced Host Controller Interface (AHCI) specification or the NV Memory Express (NVME) specification, and may communicate with the host device 50 according to the specific communications specification.

In this embodiment, the host device 50 may transmit a plurality of host device commands and corresponding logical addresses to the memory controller 110 in order to indirectly access the NV memory 120 in the data storage device 100. The memory controller 110 receives the plurality of host device commands and the logical addresses and translates the plurality of host device commands into memory operating commands (hereinafter operating commands) respectively, and determines the physical addresses corresponding to the logical addresses according to the logical-to-physical mapping table. As a result, the operating commands are arranged to control the specific physical addresses of the NV memory 120 to perform reading, writing/programming, etc., wherein the physical addresses are preferably expressed with logic unit numbers, block numbers, plane numbers, page numbers or sector numbers.

Figure 2:
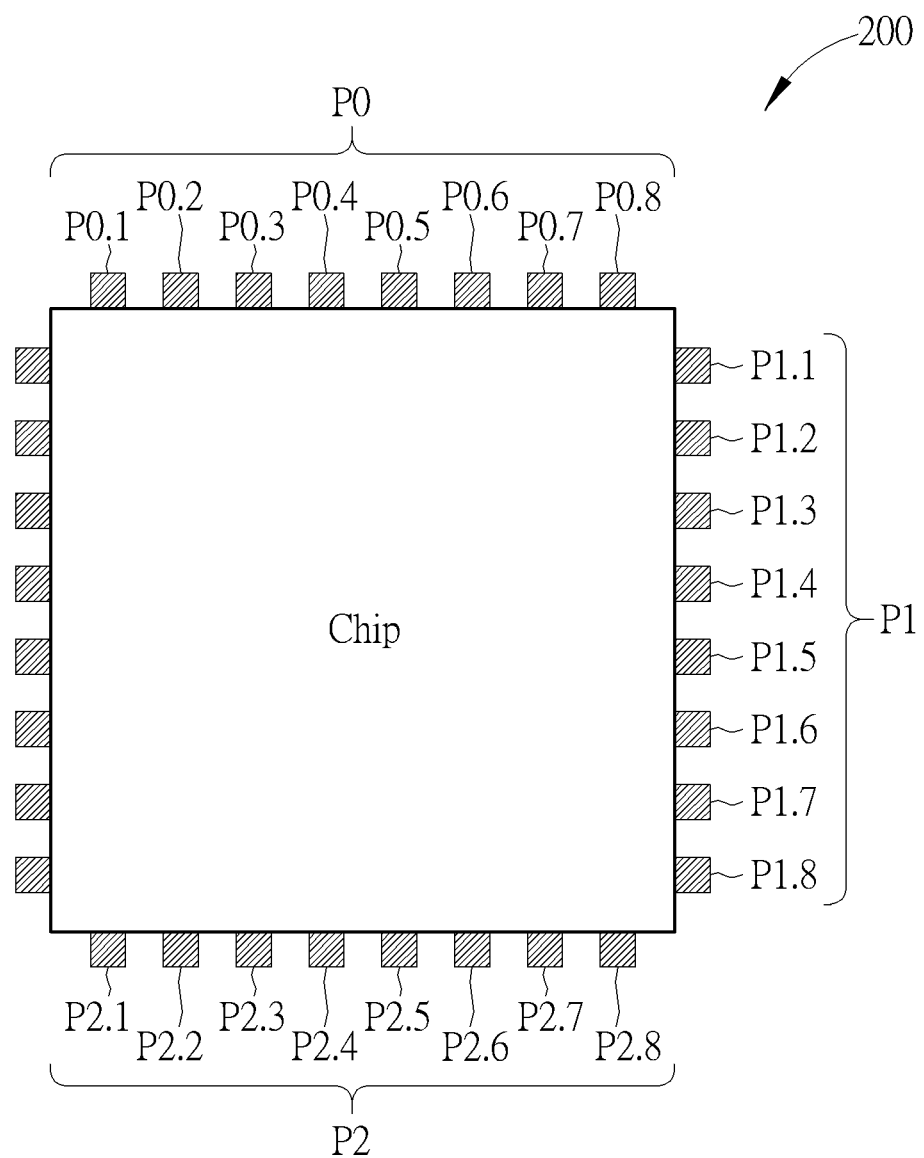
FIG. 2 illustrates an example of implementing a chip of the memory controller shown in FIG. 1.

FIG. 2 illustrates an example of implementing a chip of the memory controller 110 shown in FIG. 1, but the present invention is not limited thereto. The GPIO pins of the chip 200 may comprise multiple sets of pins such as three set of pins, wherein the first set of pins P0 may comprise pins P0.1, P0.2, P0.3, P0.4, P0.5, P0.6, P0.7 and P0.8, the second set of pins P1 may comprise pins P1.1, P1.2, P1.3, P1.4, P1.5, P1.6, P1.7 and P1.8, and the third set of pins P2 may comprise pins P2.1, P2.2, P2.3, P2.4, P2.5, P2.6, P2.7 and P2.8}. The user may pull high or pull low the voltage levels of these three sets of pins, in order to set the secondary system configuration setting values. In the present invention, the main system configuration setting values are either stored in or provided by the eFuse circuit 113 instead. The GPIO pins, however, provide very few secondary system configuration setting values. For example, only the first set of pins P0 is used to provide the secondary system configuration setting values, while the second and third sets of pins may be used for other purposes, such as controlling the operations of LEDs or buzzers, or being used as a Serial Peripheral Interface (SPI) Bus. In this way, the usage of the GPIO pins can be more flexible.

Figure 3:
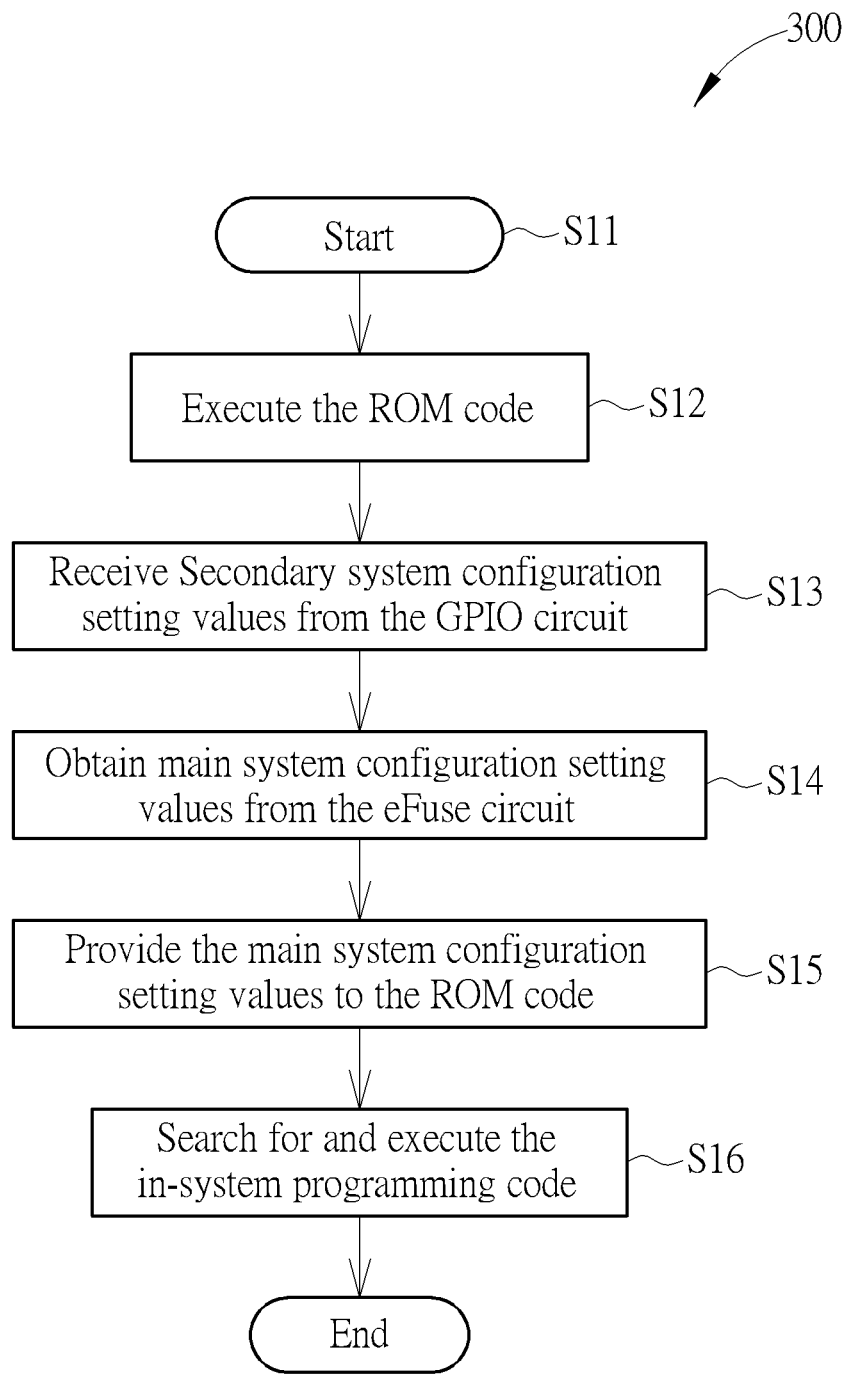
FIG. 3 illustrates a working flow of a method for performing configuration management (such as system configuration setting) according to an embodiment of the present invention.

FIG. 3 illustrates a working flow 300 of a method for performing configuration management (such as system configuration setting) according to an embodiment of the present invention. For example, under the control of the processing circuit such as the processor 112, the controller such as the memory controller 110 may perform the operations of the working flow 300.

In Step S11, the power is on (labeled "Power on" in FIG. 3, for brevity). According to this embodiment, the data storage device 100 may obtain power from the host device 50, and the memory controller 110 may automatically start operating. For example, the data storage device 100 has been installed at the host device 50 and coupled to the host device 50. When the host device 50 is powered on, the host device 50 provides power to the data storage device 100. In another example, after the host device 50 is powered on, the user may couple the data storage device 100 to the host device 50. As a result, the host device 50 may provide power to the data storage device 100.

In Step S12, the memory controller 110 (e.g. the processing circuit such as the processor 112) executes the ROM code, for example, the memory controller 110 may read the ROM code from the ROM 112M in order to execute the ROM code. The ROM code may comprise multiple basic control commands, for example, the basic control commands required for controlling the basic operations of the GPIO circuit 130 or the eFuse circuit 113.

In Step S13, the memory controller 110 receives the secondary system configuration setting values from the GPIO circuit 130. During executing the ROM code, the processing circuit such as the processor 112 may control the operations of the GPIO circuit 130 and detect the state of the GPIO pins, such as the first set of states 130S of the first set of pins P0, in order to refer to first set of states 130S to provide the secondary system configuration setting values required for running the ROM code. For example, the value of the first set of states 130S can be expressed with either 8 bits (e.g. "00000001") or 1 bit (e.g. "1"). In this situation, the first set of states 130S may indicate that the main system configuration setting values are provided by the eFuse circuit 113.

In Step S14, the memory controller 110 obtains the main system configuration setting values from the eFuse circuit 113. During executing the ROM code, the processor 112 of the memory controller 110 reads the main system configuration setting values stored by the eFuse circuit 113, wherein each setting value may represent a setting result. For example, the first setting value represents the scan offset value of the in-system programming code, the second setting value represents whether to turn off the randomizer of the NV memory 120 or not, the third setting value represents whether to ignore the busy/ready state of the NV memory 120 or not, and so on. Please note that the respective lengths of the setting values may be different from one another, for example, the first setting value may be expressed with one byte, and each of the second and third setting values may be expressed with one bit.

In Step S15, the memory controller 110 provides the main system configuration setting values to the ROM code. During executing the ROM code, the processor 112 may enable or disable specific functions according to the ROM code and the main system configuration setting values, for example, not turning off the randomizer or enabling the randomizer. After the execution of the ROM code is completed or the ROM code is executed halfway to a predetermined state, the data storage device 100 or the memory controller 110 enters the ROM mode.

In Step S16, the memory controller 110 searches for and executes the in-system programming code. After entering the ROM mode, the memory controller 110 (e.g. the processing circuit such as the processor 112) may search for the in-system programming code in the NV memory 120 and execute the in-system programming code according to the preset or main system configuration setting values (e.g. a scan offset value of the in-system programming code). After the in-system programming code is successfully found and executed, the data storage device 100 or the memory controller 110 enters the normal mode.

Under the normal mode, the data storage device 100 may receive and execute a host device command from the host device 50. If the data storage device 100 has not received any host device command from the host device 50 under the normal mode, the data storage device 100 may enter a standby or power saving mode. In the normal mode, the memory controller 110 may more effectively control the operations of the NV memory 120, for example, the memory controller 110 may command the NV memory 120 to switch from a low speed single data rate (SDR) mode to a high speed double data rate (DDR) mode, and then utilize the DDR mode to control the operations of the NV memory 120. Further, the memory controller 110 may further load at least one portion (e.g. a portion or all) of the logical-to-physical mapping table from the NV memory 120 to the buffer memory 116 or the DRAM, in order to accelerate obtaining the physical addresses corresponding to the logical addresses.

Further, the aforementioned at least one in-system programming code such as one or more in-system programming codes may comprise a set of additional control commands to control various functions of the memory controller 110, to make the data storage device 100 be equipped with the functions, for example, using a key to encrypt/decrypt the user data from the host device 50, wherein these functions may comprise a plurality of predetermined functions corresponding to a certain data storage device product (which may have a certain product model number), such as some customized functions, but the present invention is not limited thereto. Further, the key may be a private key within the public-private key set, for decrypting the user data that is encrypted by the public key.

In another embodiment, the aforementioned at least one in-system programming code such as the one or more in-system programming codes may be divided into a core program code and multiple auxiliary program codes. After the memory controller 110 successfully finds and executes the core program code, the memory controller 110 may enter the normal mode. Afterwards, the memory controller 110 may execute different auxiliary program codes according to different trigger conditions. For example, when a garbage collection trigger condition is satisfied, the memory controller 110 searches for and executes at least one garbage auxiliary program code related to the garbage collection process.

In another embodiment, as all system configuration setting values are stored in or provided by the eFuse circuit 113, the GPIO pins no longer provide any system configuration setting value. In this setting, in the working flow 300 of the method for performing configuration management (such as system configuration setting) during booting up, Step S13 may be skipped, and all of the system configuration setting values may be obtained from the eFuse circuit 113 in Step S14, and then all of the system configuration setting values may be provided to the ROM code in Step S15.

According to this embodiment, the eFuse circuit 113 may comprise a plurality of eFuse units (such as one-time programmable eFuse units), for storing or recording the setting information of a plurality of bits. More particularly, any eFuse unit within the plurality of eFuse units may be preset to have a first logic state that represents a first predetermined bit, and the aforementioned any eFuse unit can only be programed once to make it have a second logic state that represents a second predetermined bit. For example, the first predetermined bit and the second predetermined bit may be 0 and 1, respectively. In another example, the first predetermined bit and the second predetermined bit may be 1 and 0, respectively. Since the eFuse circuit 113 in this embodiment may record the setting information of multiple bytes, the eFuse circuit 113 is capable of providing the main system configuration settings required by the ROM code. In comparison with the aforementioned conventional architecture commonly used in this field, the present invention can significantly reduce the total bit count of the secondary system configuration based on the GPIO circuit 130 (e.g. reduce it from tens of bits to a few bits, such as one or two bits), which is advantageous in many ways.

In another embodiment, in Step S16, the memory controller 110 may output the Read ID command (such as a command for reading a manufacturer ID of the manufacturer) to the NV memory 120 first, in order to obtain the manufacture ID stored in the NV memory 120. The memory controller 110 may obtain the program code and command (s) corresponding to the manufacturer ID according to the manufacturer ID and the main system configuration setting values (e.g. the scan offset value of the in-system programming code) recorded by the eFuse circuit 113. Afterward, the memory controller 110 executes the program code and command(s) corresponding to the manufacturer ID in order to search for the in-system programming code in the NV memory 120. After the in-system programming code is found successfully, the memory controller 110 executes the in-system programming code to enter the normal mode.

In another embodiment, the command set of a specific manufacturer may be programed to the eFuse circuit 113. For example, the page-reading command of the manufacturer #0 may be "00h", and the page-reading command of the manufacturer #1 may be "10h". In Step S16, the memory controller 110 outputs the Read ID command to the NV memory 120 in order to obtain the manufacturer ID stored in the NV memory 120. For example, in the case of the manufacturer #1, the memory controller 110 determines that the manufacturer of the NV memory 120 is the manufacturer #1, and afterward, the memory controller 110 may take "10h" as the page-reading command of the NV memory 120, to search for or read the in-system programming code.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing configuration management, the method being applicable to a data storage device, the data storage device comprising a non-volatile (NV) memory, the NV memory comprising at least one NV memory element, and the method comprising:
   reading a read-only memory (ROM) code from a ROM to execute the ROM code;
   during executing the ROM code, detecting a first set of states of a general-purpose input/output (GPIO) circuit to perform a first portion of system configuration settings of the ROM code according to the first set of states;
   during executing the ROM code, detecting a second set of states of an electronic fuse (eFuse) circuit to perform a second portion of system configuration settings of the ROM code according to the second set of states; and
   executing at least one program code to make the data storage device be ready for being accessed by a host device.

2. The method of claim 1, wherein the at least one program code comprises a first program code and a second program code; and executing the at least one program code to make the data storage device to be ready for the host device to access comprises:
   executing the first program code and then executing the second program code, to make the data storage device be ready for the host device to access.

3. The method of claim 2, wherein the first program code is a boot in-system programming (ISP) code.

4. The method of claim 3, wherein the operation of reading the ROM code from the ROM to execute the ROM code belongs to an initialization process, and the operation of executing the first program code belongs to a boot process.

5. The method of claim 2, wherein the first program code comprises a set of boot control commands, to control booting of the data storage device.

6. The method of claim 5, wherein the first program code is stored in the NV memory in advance, and is read from the NV memory to control booting of the data storage device.

7. The method of claim 5, wherein the second program code comprises a set of additional control commands, to make the data storage device have multiple functions.

8. The method of claim 7, wherein the second program code is stored in the NV memory in advance, and is read from the NV memory to control the functions.

9. The method of claim 2, wherein the second program code is an in-system programming (ISP) code.

10. The method of claim 1, further comprising:
    according to at least one system configuration setting based on the eFuse circuit, selecting a portion of predetermined parameters from a plurality of predetermined parameters, in order to determine a searching range of a first program code within the at least one program code, for searching for the first program code in the searching range.

11. A data storage device, comprising:
   a non-volatile (NV) memory, arranged to store information, wherein the NV memory comprises at least one NV memory element; and
   a controller, coupled to the NV memory, the controller arranged to control operations of the data storage device, wherein the controller comprises:

a read-only memory (ROM), arranged to store a ROM code;

an electronic fuse (eFuse) circuit, arranged to store setting information; and a processing circuit, arranged to control the controller according to a plurality of host device commands from a host device, to allow the host device to access the NV memory via the controller, wherein:

the processing circuit reads the ROM code from the ROM, to execute the ROM code;

during executing the ROM code, the processing circuit detects a first set of states of a General-Purpose Input/output (GPIO) circuit in the data storage device, to perform a first portion of system configuration settings of the ROM code according to the first set of states;

during executing the ROM code, the processing circuit detects a second set of states of an electronic fuse (eFuse) circuit to perform a second portion of system configuration settings of the ROM code according to the second set of states; and the processing circuit executes at least one program code to make the data storage device be ready for being accessed by the host device.

12. The data storage device of claim 11, wherein the at least one program code comprises a first program code and a second program code; and the processing circuit executes the first program code and then executes the second program code, to make the data storage device be ready for being accessed by the host device.

13. The data storage device of claim 12, wherein the first program code is a boot in-system programming (ISP) code.

14. The data storage device of claim 13, wherein the operation of reading the ROM code from the ROM to execute the ROM code belongs to an initialization process, and the operation of executing the first program code belongs to a boot process.

15. The data storage device of claim 12, wherein the first program code comprises a set of boot control commands arranged to control booting of the data storage device.

16. A controller of a data storage device, the data storage device comprising the controller and a non-volatile (NV) memory, the NV memory comprising at least one NV memory element, and the controller comprising:

a read-only memory (ROM), arranged to store a ROM code;

an electronic fuse (eFuse) circuit, arranged to store setting information; and a processing circuit, arranged to control the controller according to a plurality of host device commands from a host device, to allow the host device to access the NV memory via the controller, wherein:

the processing circuit reads the ROM code from the ROM, to execute the ROM code;

during executing the ROM code, the processing circuit detects a first set of states of a General-Purpose Input/output (GPIO) circuit in the data storage device, to perform a first portion of system configuration settings of the ROM code according to the first set of states;

during executing the ROM code, the processing circuit detects a second set of states of the eFuse circuit, in order to perform a second portion of system configuration settings of the ROM code according to the second set of states; and the processing circuit executes at least one program code, to make the data storage device be ready for being accessed by the host device.

17. The controller of claim 16, wherein the at least one program code comprises a first program code and a second program code; and the processing circuit executes the first program code and then executes the second program code, to make the data storage device be ready for being accessed by the host device.

18. The controller of claim 17, wherein the first program code is a boot in-system programming (ISP) code.

19. The controller of claim 18, wherein the operation of reading the ROM code from the ROM to execute the ROM code belongs to an initialization process, and the operation of executing the first program code belongs to a boot process.

20. The controller of claim 17, wherein the first program code comprises a set of boot control commands, to control booting of the data storage device.

* * * * *